United States Patent
Soelberg et al.

(10) Patent No.: US 9,973,448 B2
(45) Date of Patent: May 15, 2018

(54) PREDICTIVE CACHED BUFFER FOR COMMUNICATION DEVICES

(71) Applicants: AT&T Intellectual Property I, LP, Atlanta, GA (US); AT&T Mobility II LLC, Atlanta, GA (US)

(72) Inventors: Emily Soelberg, Atlanta, GA (US); Murali Narayanan, Redmond, WA (US); Glenn Blumstein, Mercer Island, WA (US); Brad Ree, Cumming, GA (US); Ginger Chien, Bellevue, WA (US); Venson Shaw, Kirkland, WA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 220 days.

(21) Appl. No.: 14/630,878

(22) Filed: Feb. 25, 2015

(65) Prior Publication Data
US 2016/0248704 A1    Aug. 25, 2016

(51) Int. Cl.
*H04L 12/861* (2013.01)
*H04W 4/02* (2018.01)
(Continued)

(52) U.S. Cl.
CPC ........ *H04L 49/9005* (2013.01); *H04L 47/522* (2013.01); *H04L 67/18* (2013.01);
(Continued)

(58) Field of Classification Search
CPC ............... H04L 47/522; H04L 49/9005; H04L 65/4084; H04L 67/18; H04L 67/22;
(Continued)

(56) References Cited

U.S. PATENT DOCUMENTS 4,907,080 A * 3/1990 Campbell ............ G07C 9/0015
                                                    348/161
7,272,405 B2  9/2007 Maillard
(Continued)

FOREIGN PATENT DOCUMENTS

EP           2950247 A1 * 12/2015 ............ H04W 4/003
KR    1020130098841 A    9/2013
(Continued)

OTHER PUBLICATIONS

Evensen, Kristian et al., "Mobile Video Streaming Using Location-Based Network Prediction and Transparent Handover", Simula Research Laboratory, Norway, Jun. 2011, 6 pages.
(Continued)

*Primary Examiner* — Omar J Ghowrwal
*Assistant Examiner* — Kokou R Detse
(74) *Attorney, Agent, or Firm* — Guntin & Gust, PLC; Ralph Trementozzi

(57) ABSTRACT

Aspects of the subject disclosure may include, for example, a method that includes presenting a media content item at a communication device coupled to a network, and analyzing the media content item to determine a current desired cache size and to predict a future desired cache size for presentation of the media content item; the desired cache size varies during the presentation in accordance with properties of the media content item. The method further includes adjusting a cache of the communication device in accordance with the analyzing. Other embodiments are disclosed.

20 Claims, 10 Drawing Sheets

(51) Int. Cl.
*H04L 12/873* (2013.01)
*H04L 29/08* (2006.01)
*H04W 84/04* (2009.01)
*H04L 29/06* (2006.01)

(52) U.S. Cl.
CPC .............. *H04L 67/22* (2013.01); *H04L 67/30* (2013.01); *H04W 4/026* (2013.01); *H04L 65/4084* (2013.01); *H04L 67/322* (2013.01); *H04W 4/028* (2013.01); *H04W 84/042* (2013.01)

(58) Field of Classification Search
CPC ...... H04L 67/30; H04L 67/322; H04W 4/026; H04W 4/028; H04W 84/042
USPC .......................................................... 370/429
See application file for complete search history.

(56) References Cited

U.S. PATENT DOCUMENTS

| | | | |
|---|---|---|---|
| 8,391,896 B2 | 3/2013 | Curcio et al. | |
| 8,607,288 B2 * | 12/2013 | Abdolsalehi | H04L 12/1813 709/203 |
| 8,621,500 B2 | 12/2013 | Weaver et al. | |
| 8,639,260 B2 | 1/2014 | Fox et al. | |
| 8,700,728 B2 | 4/2014 | Luna et al. | |
| 8,838,783 B2 | 9/2014 | Luna et al. | |
| 9,414,222 B1 * | 8/2016 | Dixon | H04L 67/00 |
| 2004/0214583 A1 | 10/2004 | Graham et al. | |
| 2005/0071599 A1 * | 3/2005 | Modha | G06F 9/5016 711/170 |
| 2010/0306373 A1 * | 12/2010 | Wormley | H04L 67/1029 709/224 |
| 2010/0312905 A1 | 12/2010 | Sandmann et al. | |
| 2012/0257560 A1 | 10/2012 | Srinivasan et al. | |
| 2013/0151652 A1 * | 6/2013 | Brech | G06F 17/30902 709/216 |
| 2013/0151659 A1 | 6/2013 | Alberth et al. | |
| 2013/0159552 A1 | 6/2013 | Xiang et al. | |
| 2013/0262704 A1 | 10/2013 | Jain | |
| 2014/0095943 A1 | 4/2014 | Kohlenberg et al. | |
| 2014/0258505 A1 | 9/2014 | Liao et al. | |
| 2016/0142749 A1 * | 5/2016 | Francis | H04H 20/18 725/37 |

FOREIGN PATENT DOCUMENTS

| | | | | |
|---|---|---|---|---|
| WO | 2014140526 A1 | 9/2014 | | |
| WO | WO 2014140526 A1 * | 9/2014 | ......... | H04L 67/2847 |

OTHER PUBLICATIONS

Lam, Kam-Yiu et al., "On Using Buffered Bandwidth to Support Real-time Mobile Video Playback in Cellular Networks", Department of Computer Science, City University of Hong Kong, IEEE, 2004, 8 pages.

Singh, Varun et al., "Predictive Buffering for Streaming Video in 3G Networks", IEEE, 2012, 10 pages.

"International Search Report", PCT/US16/17742 Search report, dated May 12, 2016.

Bennis, , "Living on the Edge: The Role of Proactive Caching in SG Wireless Networks", 2014.

* cited by examiner

100

200

300

400

500

600

700

PREDICTIVE CACHED BUFFER FOR COMMUNICATION DEVICES

FIELD OF THE DISCLOSURE

The subject disclosure relates to a system and method for caching content in communication devices, based on predictions of network conditions affecting the device and predictions of use of the device.

BACKGROUND

Consumption of on-demand media content, particularly by mobile devices, is expected to continue to grow. Network service providers continue to implement methods for optimizing the performance of network resources to maintain customer service quality. Availability of services, and the quality of those services, is generally variable (both location-dependent and time-dependent).

BRIEF DESCRIPTION OF THE DRAWINGS

Reference will now be made to the accompanying drawings, which are not necessarily drawn to scale, and wherein.

DETAILED DESCRIPTION

Figure 1:
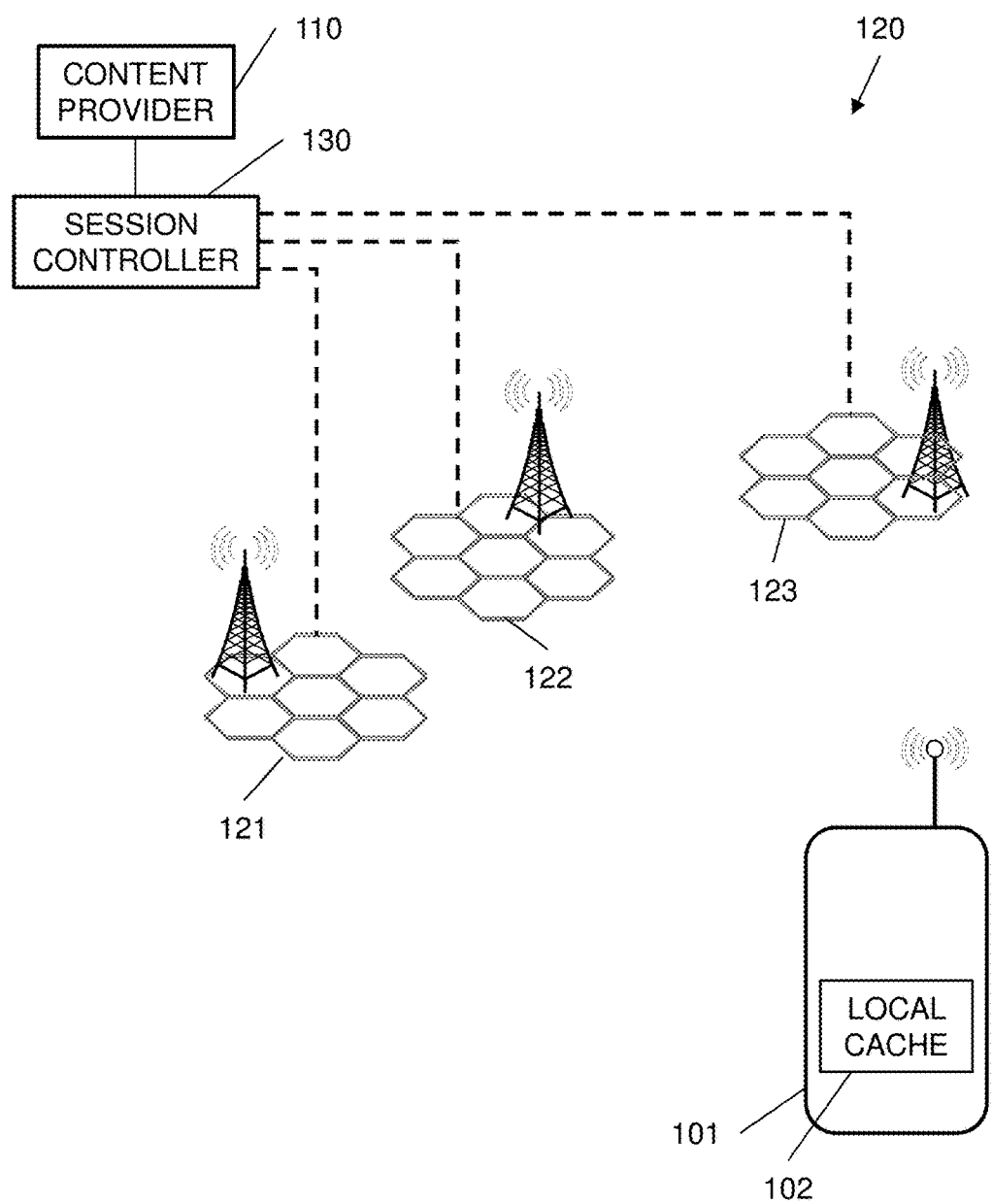
FIG. 1 depicts an illustrative embodiment of a mobile communication device with a local cache, communicating with a content provider via a network.

The subject disclosure describes, among other things, illustrative embodiments for a system and method for predicting caching requirements of a device, based on device movement, network conditions, and content requested by the device. Other embodiments are described in the subject disclosure.

One or more aspects of the subject disclosure include a server functioning as a session controller and in communication with a mobile communication device, with the server analyzing properties of a media content item currently presented at the communication device, predicting caching requirements for that content item based on those properties, and predicting future caching requirements based on properties of a predicted future content item. It will be appreciated that the term "communication device" as used herein can apply, in various embodiments, to any of a wide variety of computing equipment with one or more applications for performing operations as detailed below.

One embodiment of the subject disclosure includes a method comprising transmitting, by a system including a processor, media content via a network to a communication device of a user for caching at a local cache of the communication device, analyzing first historical data regarding movement of the communication device, and analyzing second historical data regarding consumption of content at the communication device. The method also comprises predicting a future location of the communication device based on a current trajectory of the communication device and the first historical data, and predicting a demand for a future media content item at the communication device based on current preferences of the user and the second historical data. The method further comprises predicting a future network condition affecting provisioning of the media content at the communication device at the predicted future location, the future network condition including a change in network coverage, a change in network congestion, or a combination thereof. The method also comprises adjusting the caching based on capabilities of the communication device, the predicted future location, the future media content item and the predicted future network condition.

One embodiment of the subject disclosure includes a method comprising presenting a media content item at a communication device coupled to a network, and analyzing the media content item to determine a current desired cache size and to predict a future desired cache size for presentation of the media content item; the desired cache size varies during the presentation in accordance with properties of the media content item. The method further comprises adjusting a cache of the communication device in accordance with the analyzing.

One embodiment of the subject disclosure includes a server comprising a memory to store instructions and a processor coupled to the memory. The processor, responsive to executing the instructions, performs operations. The operations comprise presenting a media content item at a communication device coupled to a network, and analyzing properties of the media content item to determine a current desired cache size and to predict a first future desired cache size for presentation of the media content item. The operations also comprise analyzing first historical data regarding media content presented at the communication device to predict presentation of a future media content item, and analyzing properties of the future media content item to predict a second future desired cache size for presentation of the future media content item.

FIG. 1 depicts an illustrative embodiment of a system 100 in which a communication device 101 receives content from a content provider 110 over a network 120. In this embodiment, device 101 is an internet-capable communication device. As shown in FIG. 1, device 101 may move between different coverage areas 121, 122, 123 during a data session (e.g. an on-demand content session such as streaming a video program). In this embodiment and other embodiments described below, a data session can be understood as a real-time or near-real-time content session including audio, video or both. As network conditions vary between coverage areas, device 101 can experience different levels of network service quality, depending on the location of the device and the path traveled. Device 101 can also experience differences in network service quality due to a change in overthe-air (OTA) protocols and/or network coverage/performance, for example by moving from a 3G coverage area to 4G, and then to LTE. Device 101 includes a local cache 102 for storing (buffering) content in order to avoid disruption of service at the device. In accordance with an embodiment of the disclosure, system 100 includes a session controller 130 that predicts network conditions likely to be experienced by device 101, in order to determine how much content should be cached locally so that device 101 does not encounter service disruption and so that network resources can be utilized effectively.

Figure 2:
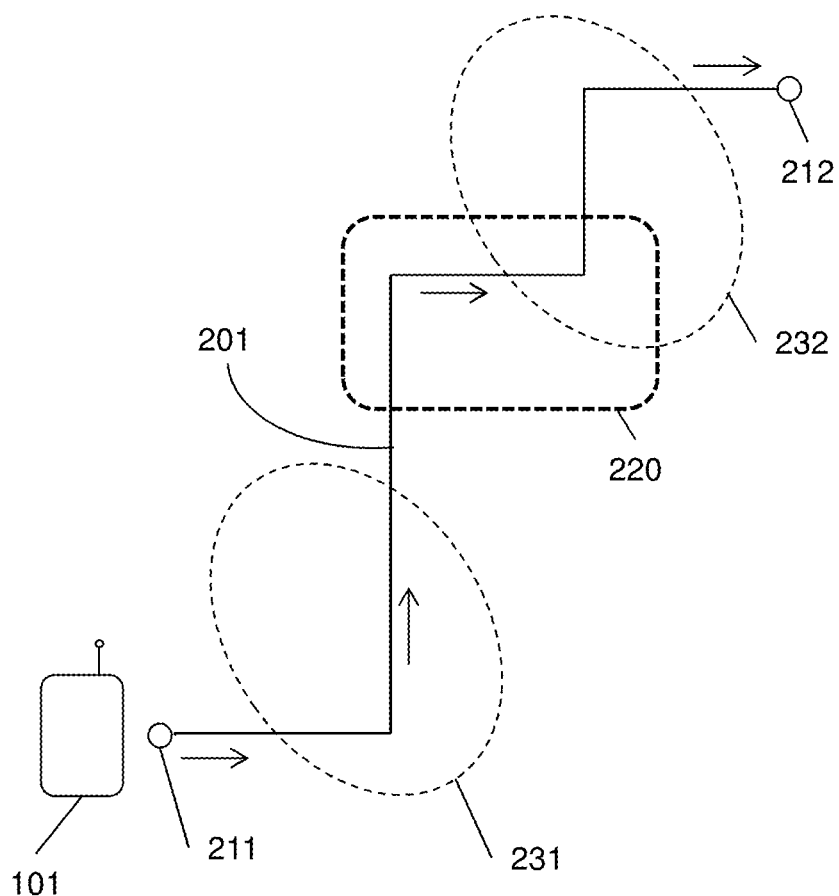
FIG. 2 depicts a mobile device traveling on a predicted path through regions of varying network performance.

FIG. 2 depicts an illustrative embodiment 200 in which device 101 moves from a starting point 211 to a destination point 212. In this embodiment, the system determines the location and direction of the device, and uses historical data to predict the route that will be traveled by the device. For example, if 211, 212 are respectively the residence and workplace locations of the device user, the system can predict the route 201 that will be traveled at particular times each workday (from 211 to 212 during a particular time period in the morning, and along the reverse route during a particular time period in the afternoon). In an embodiment, the system can gather relevant information from a navigation system that stores route information. The system can use network coverage data to predict the quality of coverage that will be experienced by the device as it travels along route 201 during those times. For example, the system can predict that the device will travel through areas 231, 232 of relatively good coverage, so that buffering requirements can be reduced in anticipation of the device traveling through those areas. The system can also use network traffic data to predict that, at the time the device follows route 201, the network will be congested in area 220. The system can then increase buffering for the device in anticipation of the device entering area 220. In an embodiment, this is done by increasing the bandwidth allocated to the device 101. In other embodiments, the system can expand the size of the buffer for the user, or switch delivery of content to lower-cost network elements.

Figure 3:
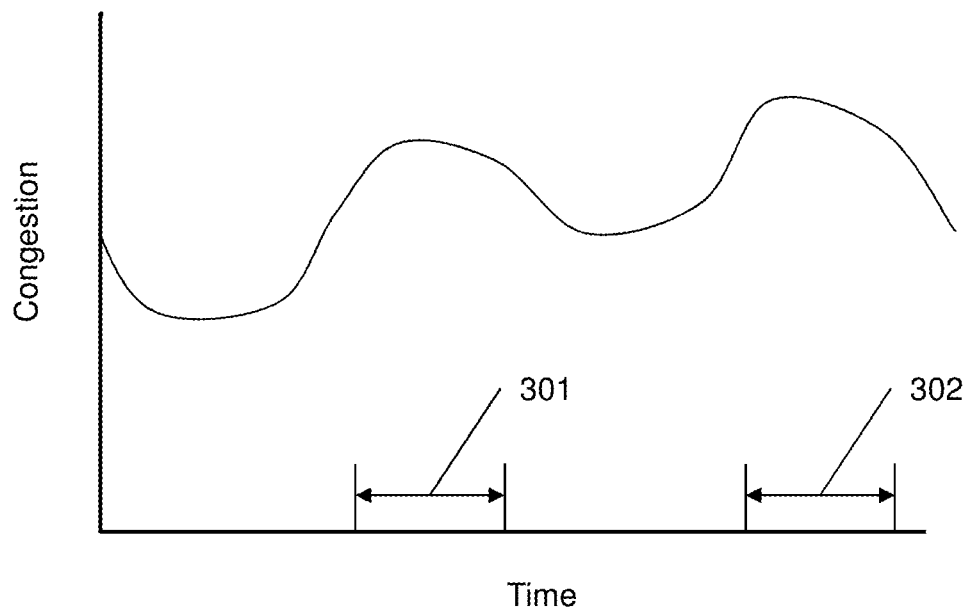
FIG. 3 depicts varying network performance for a stationary device, due to time-dependent network congestion.

The quality of service experienced by a communication device can vary even if the device is stationary, due to changing network conditions. FIG. 3 shows a schematic plot 300 of network congestion as a function of time at a given location, with congestion predictably increasing at particular times such as workday morning and evening rush hours 301, 302. In addition to time-of-day variations in network congestion, different patterns of network congestion can be predicted for different days of the week or seasons of the year. In addition, a high level of network congestion can be predicted for particular locations at particular times (e.g. at a sports venue before and during game time). In an embodiment, the system can use historical data and/or operational schedules to predict changes in network coverage and/or network performance at a particular location.

More generally, caching requirements for a user communication device can be predicted by analyzing several types of data, including: (1) current and predicted location of the device, based on speed and direction of device movement; (2) predicted location of the device, based on historical data regarding device location and movement at a particular time of day, day of week, etc.; (3) predicted network conditions (e.g. coverage and congestion), based on current data and historical data regarding network performance, at the predicted location of the device; (4) network resources predicted to be available to the device, along with the cost of those resources; (5) historical data regarding user preferences for different types of content at various locations and at various times; (6) properties of the content predicted to be consumed by the user.

Figure 4:
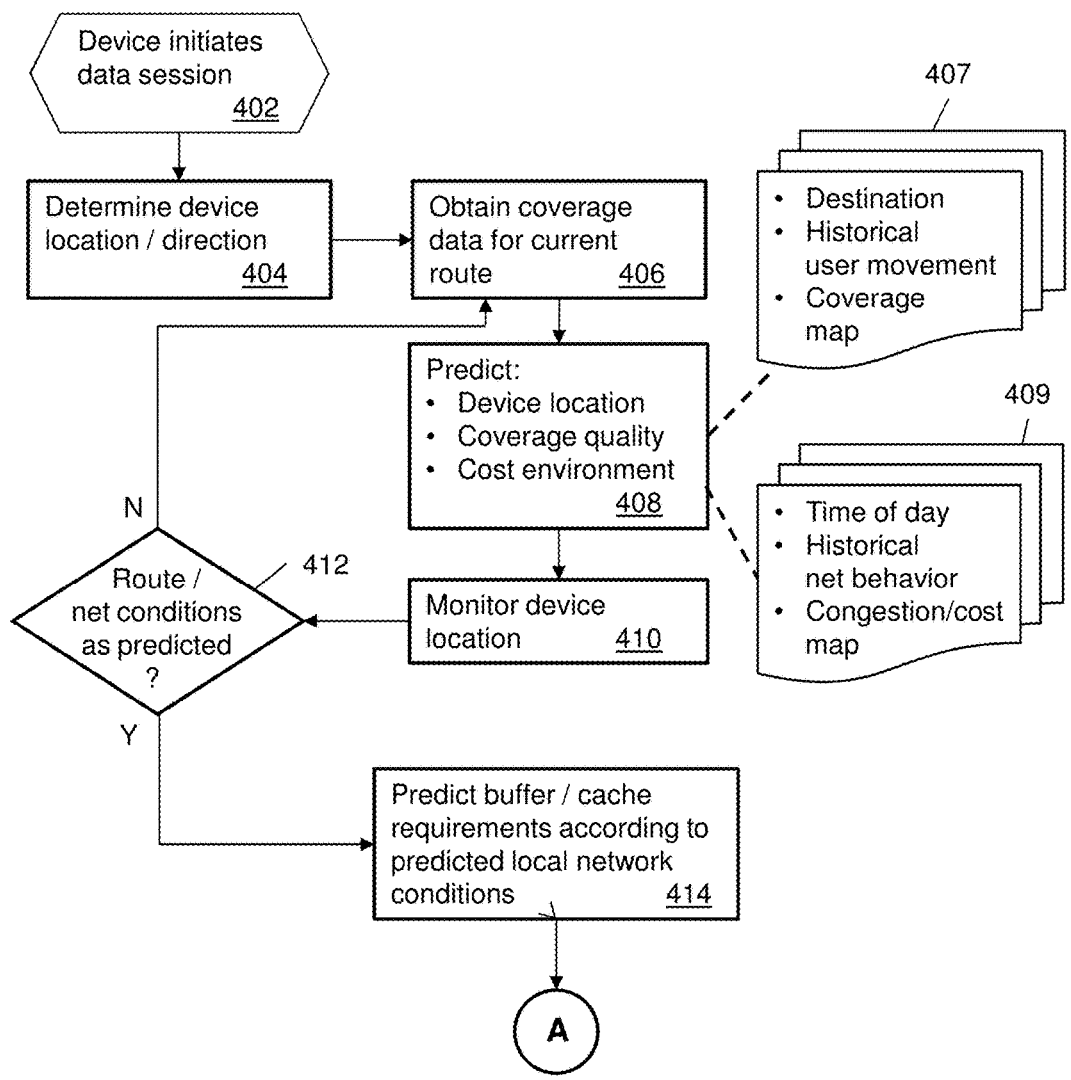
FIGS. 4-5 are connected flowcharts depicting a method for predicting local cache requirements for the devices of FIGS. 1-2, in accordance with embodiments of the disclosure.
Figure 5:
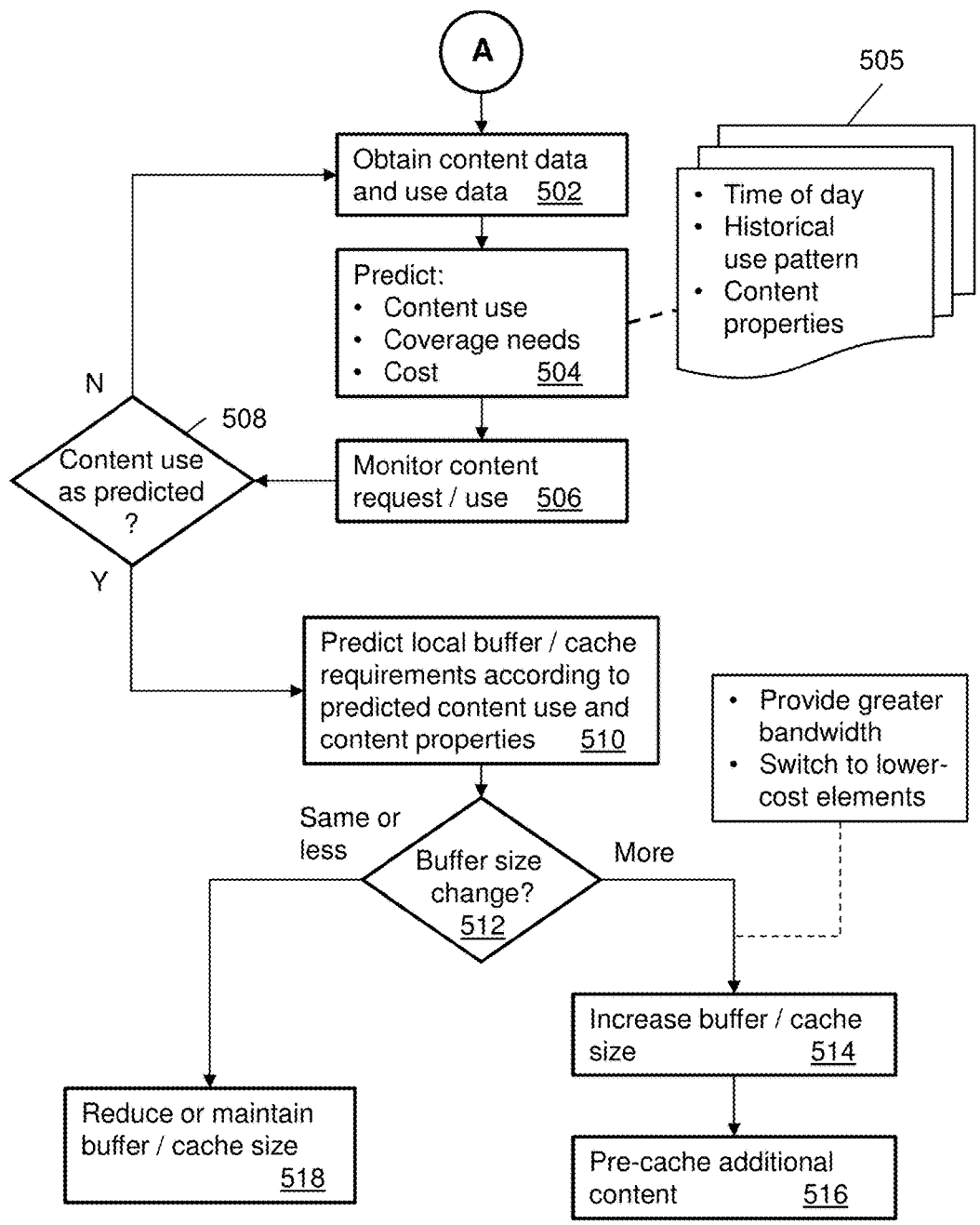

FIGS. 4-5 are connected flowcharts 400, 500 depicting a method for predicting local cache requirements for a user communication device, in accordance with embodiments of the disclosure. Device 101, which is in communication with session controller 130 of system 100 and can receive content from content provider 110, initiates a data session in step 402. The system determines the location and direction of travel of the device (step 404), e.g. by querying a global positioning system (GPS) on board the device. The system then obtains data regarding network coverage (step 406) for use in predicting the level of service the device will experience following the most probable route.

The system can deduce the probable route followed by the device, either from current location and direction data (that is, using dead reckoning) or from historical data on the user's movements. For example, if the system determines that the device is presently near Princeton and traveling north on U.S. 1 at 40 mph, it can deduce that the device will be located at North Brunswick 27 minutes later. Alternatively, the system may determine, from a record of routes traveled by the device, that on the same day of the week for the past month the device turned west onto U.S. 206 at Princeton and then traveled north to Morristown. The system can determine, by monitoring and updating device location data, whether a previously traveled route is being followed.

The system then predicts the quality of network coverage for the device (step 408), given the predicted device location and the coverage expected at that location. As noted above, coverage at a given location may vary with time, so that the time of day of device travel (along with day of week, etc.) is also a factor in predicting coverage along the predicted route. The session controller may consult a database 407 that includes known destinations, historical routes traveled by the device, and location-dependent coverage data, to predict the quality of network coverage. The session controller may also consult a database 409 that includes historical data regarding network performance (e.g. time-dependent congestion data for locations along the predicted route). This historical data may be viewed as coverage maps and congestion maps, overlaid on the predicted route of the device and continually varying with time.

In an embodiment, the system also determines the cost of network resources likely to be used by the device, in order to predict the cost environment for the device. The system can then cause content to be cached to optimize use of network resources. For example, if the user device is currently at a time and place of low network utilization (and thus, in general, relatively low cost) but predicted to be in a higher-utilization (and thus higher-cost) environment, the system can cause additional content to be cached to avoid the predicted higher cost. Conversely, if the user device is in an area with congested network traffic but predicted to enter an area with improved service, the system can cause less content to be cached in anticipation of the improved network environment.

It will be appreciated that the network resources available to the device (and hence the prediction of caching requirements) can depend on the service plan subscribed to by the user of the device. In an embodiment, the system monitors the resources available to the user device in accordance with the user's subscription profile. On the route 201, for example, if system 100 is subscribed to provide high-bandwidth service to device 101 while the device is located in area 232 but not in area 231, device 101 may experience network congestion while in area 231 and accordingly have a predictably greater caching requirement on that portion of the route.

The system monitors the device location (step 410) to update the route and the expected coverage quality. If the route traveled by the device and/or the network conditions are not as predicted (step 412), the system uses the current data to make a new prediction. The system then uses the predicted local network conditions (e.g. network coverage, congestion and/or cost at the predicted location of the device) to predict the caching requirements for the device (step 414).

In an embodiment, the system also monitors connections to network elements that are available to the user device, and the relative cost of those connections. If the user is currently in a low-cost environment but predicted to enter a higher-cost environment, the system can switch delivery of content to lower-cost network elements.

Prediction of local caching requirements can also depend on the type of content requested by the user. In step 502, the system obtains data regarding the content used by the device (e.g. content downloaded to the device on demand), and uses that data to predict future content use (step 504). In an embodiment, the system accesses a database 505 with historical data regarding the user's content consumption patterns. For example, if the user has a history of changing from a video program to an audio program at a particular time of day (so that caching requirements are reduced), the system can predictively reduce the size of the cache at that time of day to reduce cost. In another example, if the user has a history of changing from a video program with relatively fast action (e.g. a sports program) to another video program with slower action (e.g. a news program), the cache size can be predictively reduced due to the differing properties of the video programs. In another example, a user may have a history of viewing content for only about 15 seconds before switching to different content. Caching could then be limited (e.g. limited to only 15 seconds of a video program) until the user has viewed more than 15 seconds of the program.

Database 505 can also advantageously include data regarding properties of the content currently accessed by the user. In an embodiment, the system queries the database to predict the bandwidth requirements for a new program or an upcoming portion of a program being viewed by the user. The system can predict a need for increased caching due to an upcoming section of content having faster frames or denser imagery. For example, if the user is watching a video program that is currently at the 10-minute mark, and a chase scene is known to appear at the 20-minute mark, the system can predictively increase the size of the cache to ensure that the scene is presented without disruption. In another embodiment, if the user watches a sequence of episodes of a program, the system can predict caching requirements associated with properties of upcoming episodes.

The system monitors the actual content use and/or requests for content actually transmitted by the user device (step 506). If the content properties are not as predicted (step 508), the system uses the current data to make a new prediction. The system then uses the predicted content use and content properties (e.g. image speed and density for the predicted content) to enhance the location-based and network-based prediction of the caching requirements for the device (step 510).

If a need for increased caching is predicted (step 512), the system can increase the cache size (step 514) and/or push additional content to the cache (step 516). In an embodiment, the system can provide greater bandwidth to the user device to permit more efficient caching of additional content. In another embodiment, the system can push additional content to the cache using lower-cost network elements, in order to reduce the expected cost. In other embodiments, instead of or in addition to altering the cache size, the system can alter the data delivery rate and/or burst duration. For example, if access to a channel is predicted to be reduced due to congestion, an access to that channel can include a look-ahead data burst at higher-than-normal speed and/or a longer-than-normal duration, in order to increase the likelihood that required data will be transferred and thus reduce the risk that the buffer will run out of data.

Figure 6:
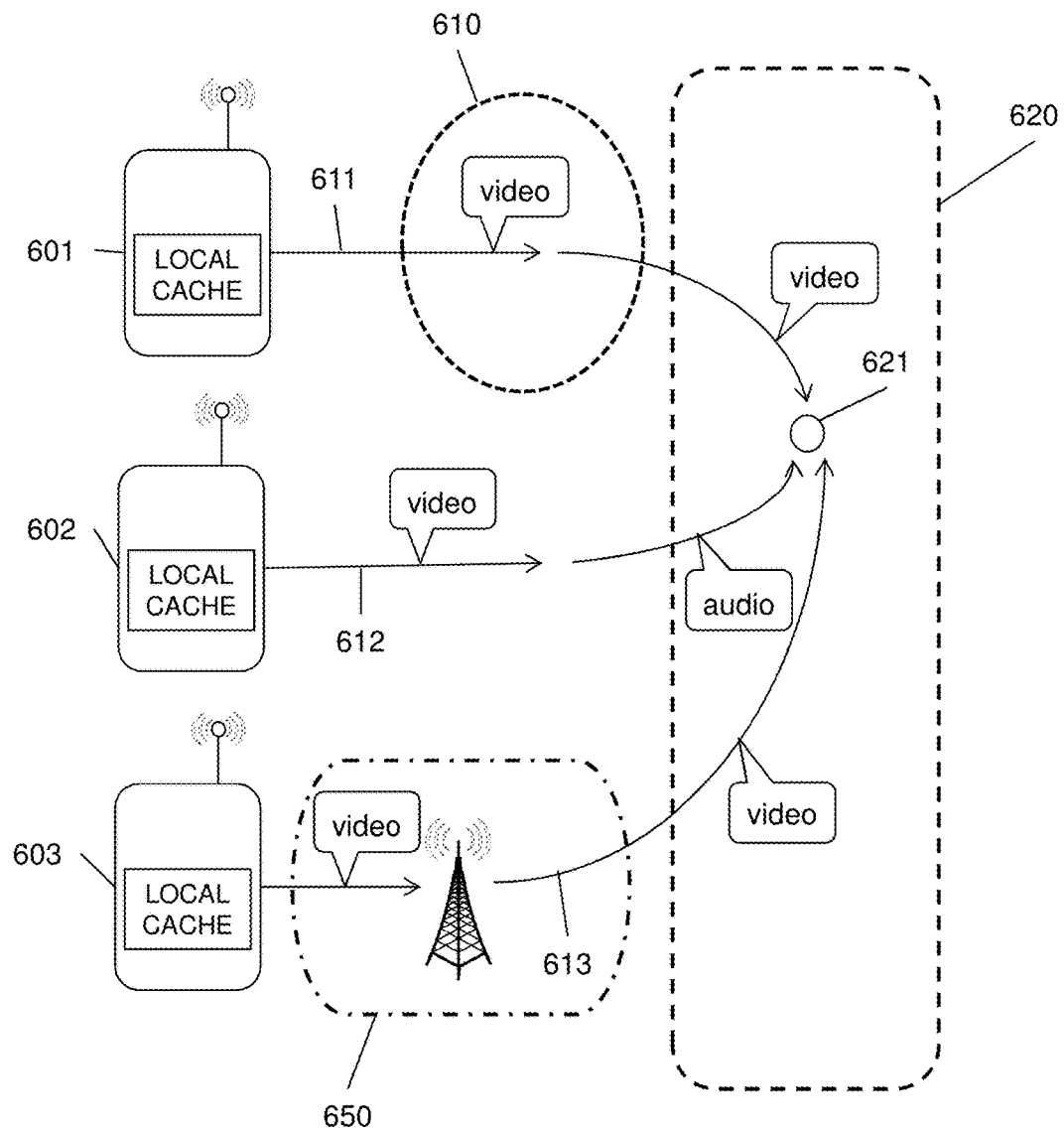
FIG. 6 depicts mobile devices with differing cache requirements based on network conditions and the content used at each device, in accordance with embodiments of the disclosure.

It will be appreciated that user behavior, the user's subscription profile, and the properties of the content consumed by the user device can influence the predicted caching requirements. FIG. 6 schematically shows a situation 600 in which three user devices 601, 602, 603 follow respective paths 611, 612, 613 toward a destination point 621. (The three paths are shown separately for clarity; it can be assumed that the paths are substantially identical.) Destination point 621 is located in a region 620 of relatively high network congestion while the devices approach.

User device 601, presenting a video program, traverses a service hot spot 610. The system analyzes the content properties of the video program (both current and predicted), looks ahead along the predicted route, and determines that increased caching will be required as device 601 moves from area 610 to area 620. The system accordingly causes additional content to be cached before device 601 exits area 610.

User device 602 has a network subscription plan different from that of device 601, and thus cannot use the enhanced service as it traverses area 610. However, user device 602 is predicted to change from a video content presentation to an audio-only content presentation before device 602 enters area 620. Device 602 is thus predicted to require a reduced cache size, even though the device is entering a relatively congested area. Accordingly, the system can reduce the size of the cache for device 602.

User device 603 is roaming on another network 650 (in this illustration, a network partnered with network 120) for the first part of the route, and afterward acquires coverage by network 120 upon entering area 620. User device 603 presents a video program throughout the route. The predicted caching requirements for device 603 upon entering area 620 will depend on numerous factors, including: (a) the quality of coverage on partner network 650, compared with improved coverage but congested network traffic in area 620; (b) the current and predicted properties of the video content, specifically the predicted image density of the content as it is presented along different portions of the route. In this instance, the system might either increase or decrease the caching for device 603.

In these embodiments, the system analyzes the time-dependent and location-dependent behavior of an individual user and the properties of a specific user device, in addition to analyzing the behavior of the network. The predictive caching of media content accordingly depends on per-user criteria as well as network performance criteria. In these embodiments, the analysis and prediction functions are performed by session controller 130. It will be appreciated, however, that the system can have a wide variety of alternative configurations.

Figure 7:
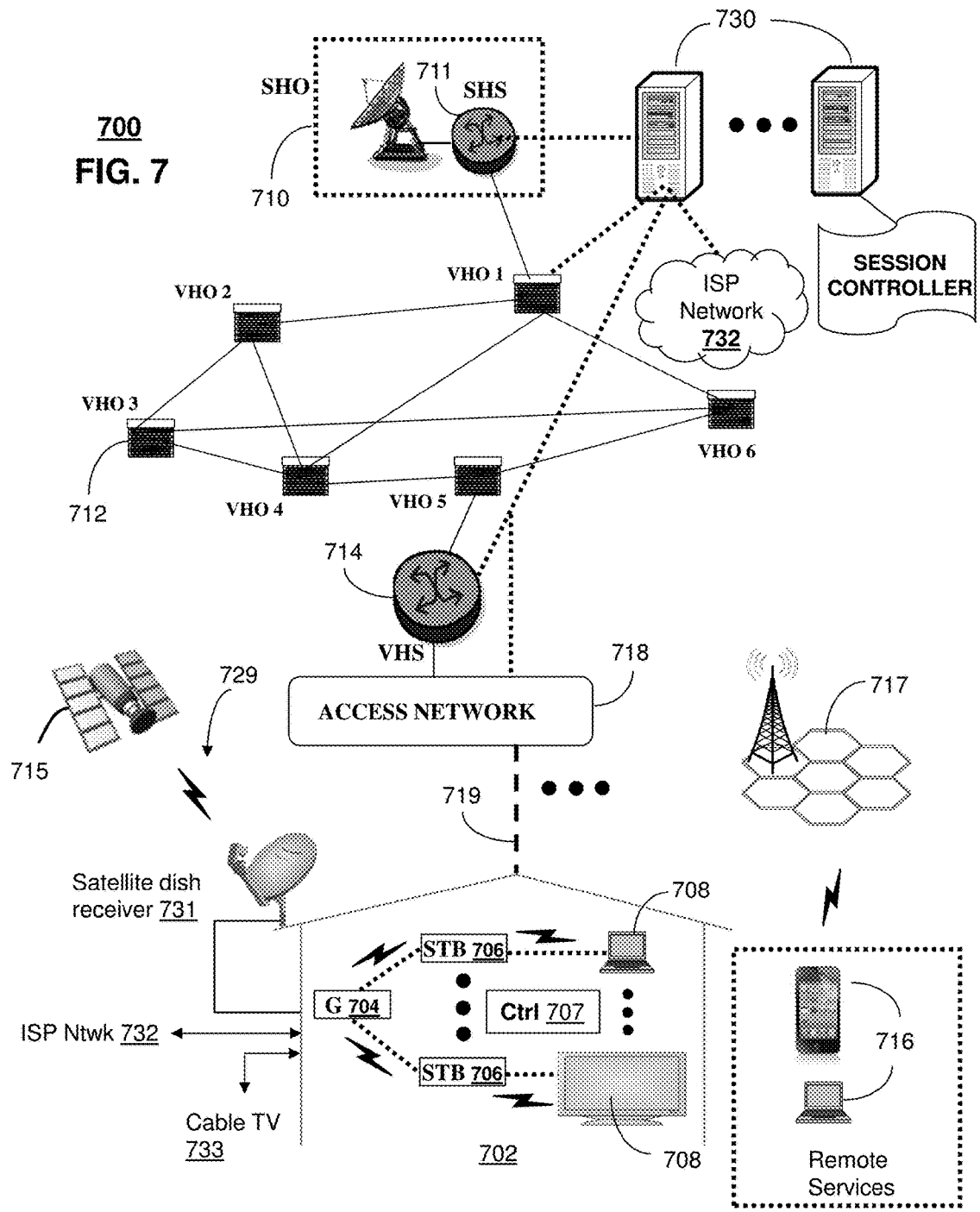
FIGS. 7-8 depict illustrative embodiments of communication systems that provide media services to the devices of FIGS. 1-2.

FIG. 7 depicts an illustrative embodiment of a first communication system 700 for delivering media content. The communication system 700 can represent an Internet Protocol Television (IPTV) media system. Communication system 700 can be overlaid or operably coupled with system 100 of FIG. 1 as another representative embodiment of communication system 700. For instance, one or more devices illustrated in the communication system 700 of FIG. 7 can perform a method that includes presenting a media content item at a communication device coupled to a network, analyzing the media content item to determine a current desired cache size and to predict a future desired cache size for presentation of the media content item; the desired cache size varies during the presentation in accordance with properties of the media content item. The method can also include adjusting a cache of the communication device in accordance with the analyzing.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a data session controller (herein referred to as controller 730). The controller 730 can use computing and communication technology to predict caching requirements for a user device, which can include among other things, analyzing network traffic and user behavior as described with reference to FIGS. 4-6. For instance, controller 730 can be perform functions similar to the functions described for session controller 130 of FIG. 1, in accordance with the methods of FIGS. 4 and 5. The media processors 706 and wireless communication devices 716 can be provisioned with software functions to utilize the services of controller 730.

Figure 8:
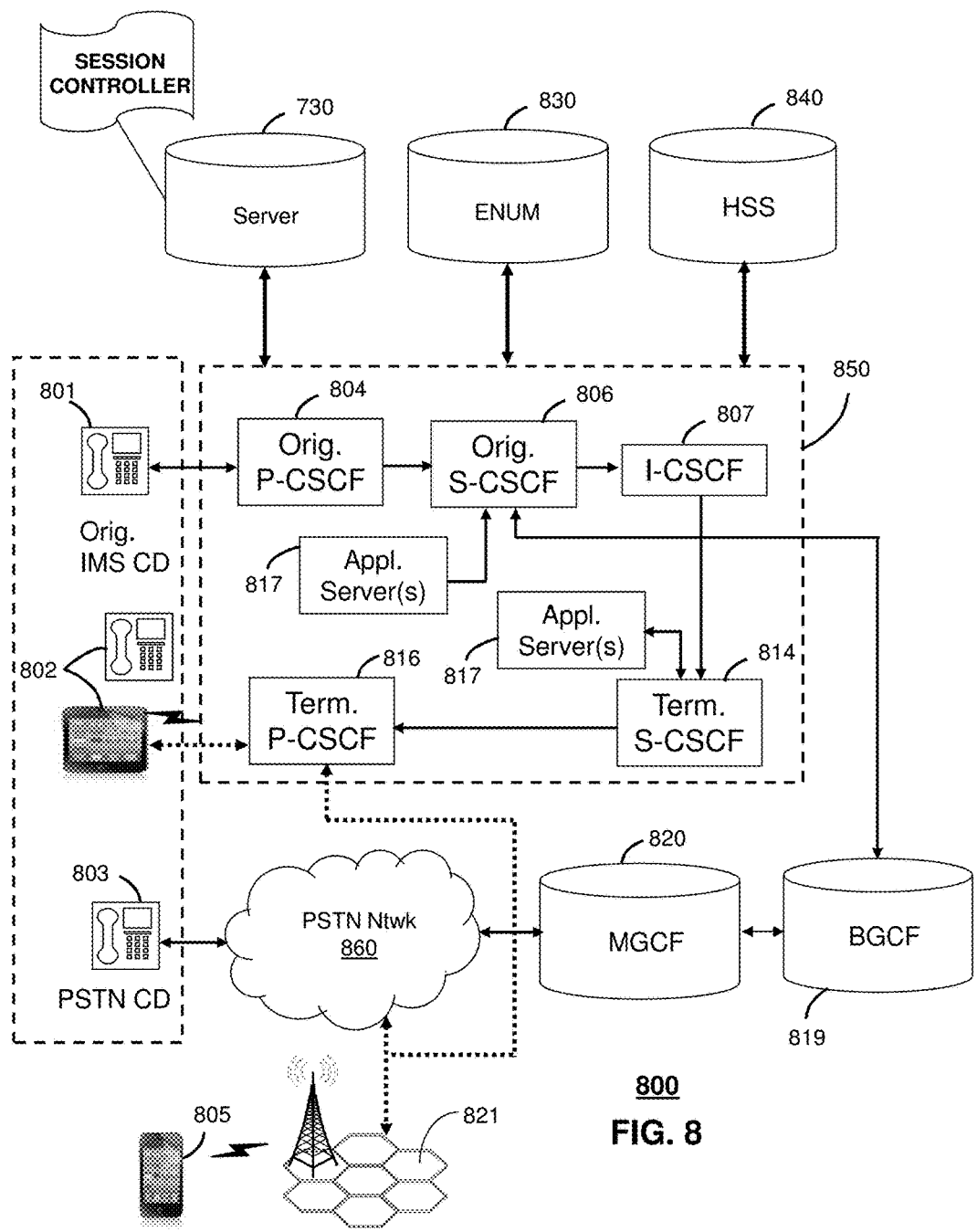

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure. FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 of FIG. 1 and communication system 700 as another representative embodiment of communication system 700. In particular, system 800 can include a server comprising a memory to store instructions and a processor coupled to the memory, in which the processor, responsive to executing the instructions, performs operations comprising presenting a media content item at a communication device coupled to a network, and analyzing properties of the media content item to determine a current desired cache size and to predict a first future desired cache size for presentation of the media content item. The operations can also comprise analyzing first historical data regarding media content presented at the communication device to predict presentation of a future media content item, and analyzing properties of the future media content item to predict a second future desired cache size for presentation of the future media content item.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (ASs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The controller 730 of FIG. 7 can be operably coupled to communication system 800 for purposes similar to those described above. Controller 730 can perform function network analysis and content analysis thereby provide predictive caching services to the CDs 801, 802, 803 and 805 of FIG. 8, similar to the functions of session controller 130 of FIG. 1, in accordance with the method of FIGS. 4-5. CDs 801, 802, 803 and 805 can be adapted with software to utilize the services of the controller 730. Controller 730 can be an integral part of the application server(s) 817 performing network management and content delivery functions, which can be substantially similar to functions performed by session controller 130, and adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
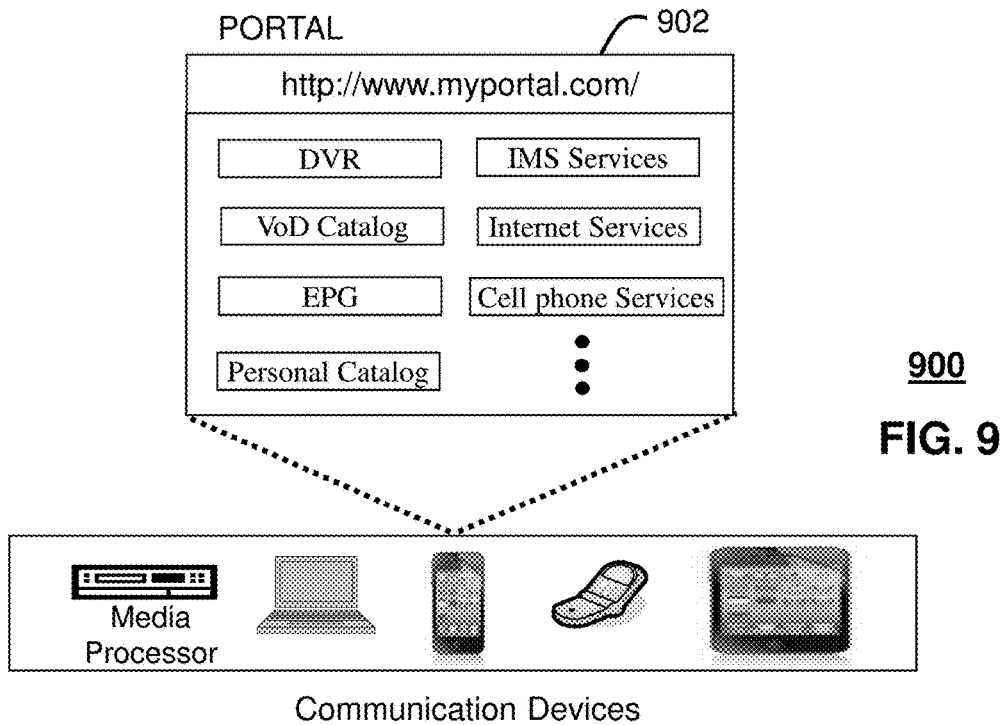
FIG. 9 depicts an illustrative embodiment of a web portal for interacting with the communication systems of FIGS. 1, 7 and 8.

FIG. 9 depicts an illustrative embodiment of a web portal 902 of a communication system 900. Communication system 900 can be overlaid or operably coupled with system 100 of FIG. 1, communication system 700, and/or communication system 800 as another representative embodiment of system 100 of FIG. 1, communication system 700, and/or communication system 800. The web portal 902 can be used for managing services of system 100 of FIG. 1 and communication systems 700-800. A web page of the web portal 902 can be accessed by a Uniform Resource Locator (URL) with an Internet browser using an Internet-capable communication device such as those described in FIG. 1 and/or and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications for predictive caching, and to adapt these applications as may be desired by subscribers and/or service providers of system 100 of FIG. 1 and communication systems 700-800. For instance, users of the services provided by session controller 130 can log into their on-line accounts and provision server 730 with content preferences for specific times of the day or days of the week, to ensure efficient caching and thereby reduce cost. Service providers can log onto an administrator account to provision, monitor and/or maintain system 100 or server 730.

Figure 10:
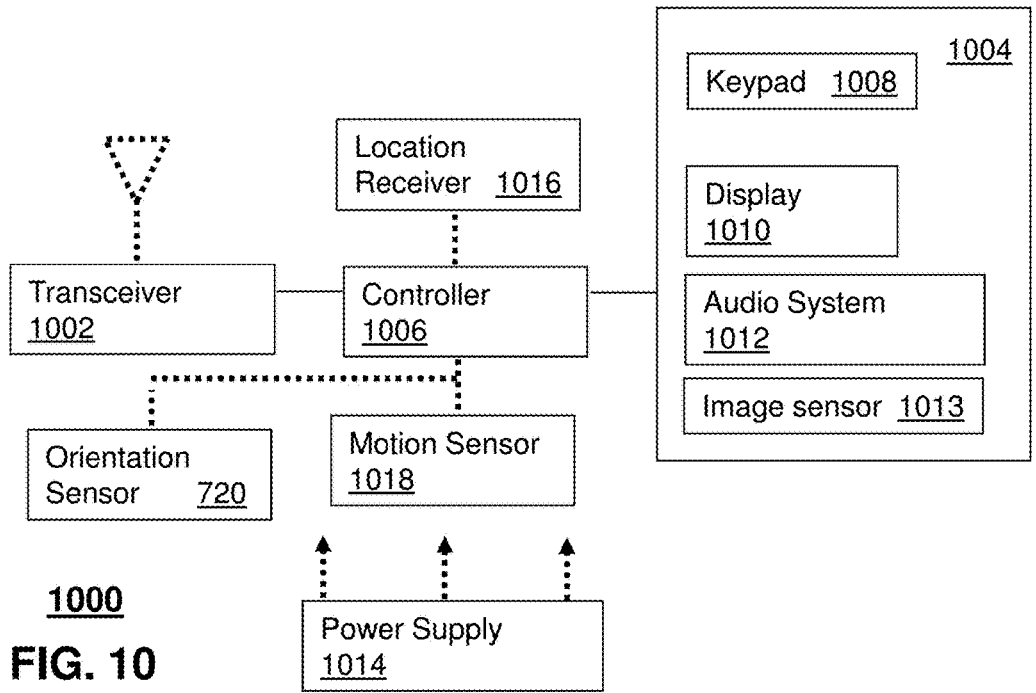
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIG. 1 and FIGS. 7-8 and can be configured to perform portions of methods 400-500 of FIGS. 4 and 5.

Communication device 1000 can comprise a wireline and/or wireless transceiver 1002 (herein transceiver 1002), a user interface (UI) 1004, a power supply 714, a location receiver 716, a motion sensor 718, an orientation sensor 720, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices shown in FIGS. 1 and/or 2, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in system 100 of FIG. 1, communication systems 700-800 of FIGS. 7-8 such as a gaming console and a media player. In addition, the controller 1006 can be adapted in various embodiments to perform content analysis and predictive caching.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
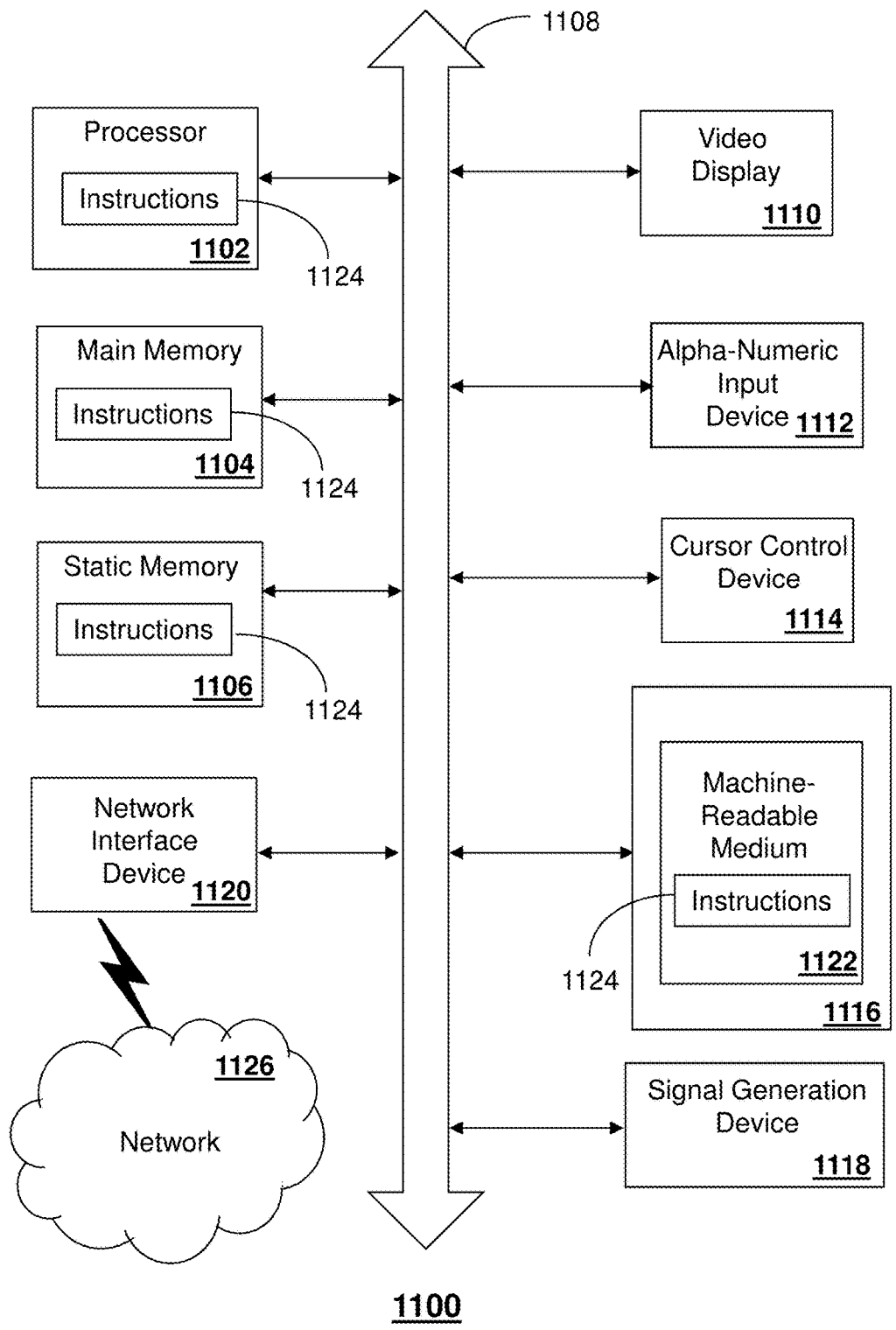
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the session controller 130, the media processor 706 and other devices of FIGS. 1, 2 and 6-10. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
transmitting, by a processing system including a processor, a current media content item via a network to a communication device of a user for caching at a local cache of the communication device, wherein a size of the local cache of the communication device is based on presentation of the current media content item;
analyzing, by the processing system, historical data regarding movement of the communication device;
analyzing, by the processing system, properties of the current media content item;
predicting, by the processing system, a bandwidth requirement for an upcoming portion of the current media content item being transmitted to the communication device based on the analyzing of the properties of the upcoming portion of the current media content item;
predicting, by the processing system, a predicted future location of the communication device, based on a current trajectory of the communication device and the historical data;
predicting, by the processing system, a predicted cost environment for the communication device associated with the predicted future location, wherein the predicted cost environment comprises a cost of network resources used by the communication device in accordance with a service plan subscribed to by the user;
predicting, by the processing system, a predicted future network condition affecting provisioning of the current media content item at the communication device at the predicted future location, the predicted future network condition including a change in network coverage, a change in network congestion, or a combination thereof; and
adjusting, by the processing system, the caching at the local cache of the communication device based on the predicting of the bandwidth requirement for the upcoming portion of the current media content item, and further based on one of capabilities of the communication device, the predicted future location, the predicted cost environment, the predicted future network condition, or a combination thereof.

2. The method of claim 1, wherein the historical data comprises a pattern of movement of the communication device.

3. The method of claim 2, wherein the pattern of movement of the communication device is periodic with respect to a time of day, a day of week, or a combination thereof.

4. The method of claim 2, wherein the current media content item comprises video content and audio content, and wherein the adjusting of the caching at the local cache of the communication device further comprises selectively adjusting a first bandwidth for caching the video content and a second bandwidth for caching the audio content, based on the analyzing of the properties of the upcoming portion of the current media content item.

5. The method of claim 4, wherein the properties of a video portion of the upcoming portion of the current media content item comprise a variation in one of a number of frames, a density of imagery, or a combination thereof, wherein the adjusting further comprises adjusting the caching at the local cache of the communication device in accordance with properties of the upcoming portion of the current media content item.

6. The method of claim 1, further comprising predicting of a demand for a future media content item based on a current media content item presented at the communication device.

7. The method of claim 6, further comprising predicting, by the processing system, a caching requirement for the local cache of the communication device based on the future media content item.

8. A method comprising:
presenting, by a processing system including a processor, a media content item at a communication device coupled to a network,
analyzing, by the processing system, a property of the media content item to determine a current size of a local cache of the communication device and to predict a future size of the local cache for presentation of the media content item with the communication device, wherein a bandwidth of the media content item varies during the presentation in accordance with the property of the media content item, wherein the analyzing comprises predicting a bandwidth requirement for an upcoming portion of the media content item, wherein the analyzing further comprises predicting a cost environment for the communication device associated with a location of the communication device, wherein the cost environment comprises a cost of network resources used by the communication device in accordance with a service plan associated with the communication device; and
adjusting, by the processing system, the future size of the local cache of the communication device in accordance with the analyzing.

9. The method of claim 8, further comprising:
analyzing, by the processing system, historical data regarding media content presented at the communication device to predict presentation of a future media content item,
wherein the adjusting further comprises adjusting the future size of the local cache in accordance with properties of the future media content item.

10. The method of claim 9, wherein the historical data further comprises data regarding past behavior of a user of the communication device.

11. The method of claim 9, wherein the analyzing further comprises predicting the future size of the local cache to obtain a predicted future cache size according to whether the future media content item comprises an audio-only program, a video-only program, or an audio-video program.

12. The method of claim 11, wherein the media content item comprises an audio-video program, the future media content item comprises an audio-only program or a video-only program, and wherein the predicted future cache size is less than the current size of the local cache.

13. The method of claim 12, further comprising analyzing, by the processing system, historical data regarding network conditions at a present location of the communication device, a predicted location of the communication device, or a combination thereof, to predict a network condition to obtain a predicted network condition affecting the presentation of the media content item.

14. The method of claim 13, wherein the predicted network condition comprises reduced network coverage, increased network congestion, or a combination thereof, and wherein the predicted future cache size is greater than the current size of the local cache.

15. The method of claim 8, wherein the properties of the media content item comprise a video image density varying during the presentation of the media content item.

16. A device comprising:
a processing system including a processor; and
a memory that stores executable instructions that, when executed by the processing system, facilitate performance of operations, the operations comprising:
presenting a media content item at a communication device coupled to a network,
analyzing properties of the media content item to determine a current size of a local cache of the communication device and to predict a future size of the local cache for presentation of the media content item, wherein the analyzing comprises predicting a bandwidth requirement for an upcoming portion of the media content item based on the properties of the media content item;
predicting a cost environment for the communication device associated with a location of the communication device, wherein the cost environment comprises a cost of network resources used by the device in accordance with a service plan associated with the communication device; and
adjusting the future size of the local cache based on the predicting of the cost environment.

17. The device of claim 16, wherein the operations further comprise adjusting the local cache of the communication device according to a first future desired cache size or a second future desired cache size.

18. The device of claim 16, wherein the operations further analyzing past behavior of a user of the communication device wherein the adjusting of the future size of the local cache is further based on the analyzing of the past behavior of the user.

19. The device of claim 16, wherein the operations further comprise:
analyzing historical data regarding network conditions at a present location of the communication device, a predicted location of the communication device, or a combination thereof, to predict a predicted network condition affecting the presentation of the media content item, and
wherein the future size of the local cache is based on the predicted network condition.

20. The device of claim 19, wherein the predicted network condition comprises reduced network coverage, increased network congestion, or a combination thereof, and wherein the future size of the local cache is greater than the current size of the local cache.

* * * * *